United States Patent
Funamoto et al.

(10) Patent No.: US 12,404,909 B2
(45) Date of Patent: Sep. 2, 2025

(54) FRICTION PAIR

(71) Applicant: NISSHINBO BRAKE, INC., Tokyo (JP)

(72) Inventors: Sota Funamoto, Gunma-ken (JP); Kenta Kurimoto, Gunma-ken (JP)

(73) Assignee: NISSHINBO BRAKE, INC., Tokyo (JP)

( * ) Notice: Subject to any disclaimer, the term of this patent is extended or adjusted under 35 U.S.C. 154(b) by 440 days.

(21) Appl. No.: 18/009,723

(22) PCT Filed: Jun. 9, 2021

(86) PCT No.: PCT/JP2021/021878
§ 371 (c)(1),
(2) Date: Dec. 10, 2022

(87) PCT Pub. No.: WO2021/256337
PCT Pub. Date: Dec. 23, 2021

(65) Prior Publication Data
US 2023/0235803 A1    Jul. 27, 2023

(30) Foreign Application Priority Data

Jun. 16, 2020 (JP) .................... 2020-103800

(51) Int. Cl.
*B28B 1/54* (2006.01)
*F16D 65/092* (2006.01)
*F16D 69/02* (2006.01)
F16D 65/12 (2006.01)

(52) U.S. Cl.
CPC ......... *F16D 69/026* (2013.01); *F16D 65/092* (2013.01); *F16D 65/125* (2013.01); *F16D 2200/0021* (2013.01); *F16D 2200/006* (2013.01)

(58) Field of Classification Search
CPC .... F16D 69/026; F16D 65/092; F16D 65/125; F16D 2200/0021; F16D 2200/006
USPC .............................. 188/250 B, 251 A, 251 M
See application file for complete search history.

(56) References Cited

U.S. PATENT DOCUMENTS

| | | | | |
|---|---|---|---|---|
| 9,920,806 | B2 * | 3/2018 | Yamamoto | F16D 69/02 |
| 12,036,696 | B2 * | 7/2024 | Sin Xicola | C04B 18/08 |
| 2011/0259686 | A1 | 10/2011 | Hattori | |
| 2018/0106321 | A1 | 4/2018 | Matsuba | |
| 2019/0376573 | A1 * | 12/2019 | Koike | F16D 69/028 |
| 2023/0220899 | A1 * | 7/2023 | Funamoto | F16D 69/026 |
| | | | | 188/218 XL |
| 2023/0341020 | A1 * | 10/2023 | Funamoto | F16D 69/026 |

FOREIGN PATENT DOCUMENTS

| | | |
|---|---|---|
| EP | 3327099 A1 | 5/2018 |
| JP | 1990-134425 | 5/1990 |
| JP | 2000265157 A | 9/2000 |
| JP | 2015147913 A | 8/2015 |
| JP | 2016-117925 | 6/2016 |
| JP | 2016132727 A | 7/2016 |
| JP | 2017002230 A | 1/2017 |
| JP | 2017-57312 | 3/2017 |
| JP | 2017193623 A | 10/2017 |
| JP | 2017-149971 | 8/2018 |
| JP | 2018135240 A | 8/2018 |
| JP | 2018-162385 | 10/2018 |
| JP | 2019-173086 | 10/2019 |
| JP | 2019-178419 | 10/2019 |
| WO | 2021010003 A | 1/2021 |

OTHER PUBLICATIONS

Office Action Issued on Jul. 24, 2024 by China Patent Office.
Office Action Issued on Jan. 17, 2025 by China Patent Office.
(Wei Chengguang), et al.,"" Shanghai: Shanghai Jiao Tong University Press, pp. 200-201, Jul. 2009.
EU Search report issued on Jun. 4, 2024 by European Patent Office.
Office Action Issued on May 14, 2025 by European Patent Office.

* cited by examiner

*Primary Examiner* — Christopher P Schwartz
(74) *Attorney, Agent, or Firm* — Apex Juris, pllc; Tracy M Heims

(57) ABSTRACT

To provide a friction couple having an enhanced effect and stability in a low speed range, where the friction couple has a disc brake pad having a friction material manufactured from a friction material composition having a binder, a fiber base, and a friction modifier, without containing a copper component and a ferrous metallic fiber, and a stainless steel disc rotor. The present invention uses a friction material composition containing 20-30 weight % of a titanate relative to an entire friction material composition as an inorganic friction modifier without containing an inorganic friction modifier that has a Mohs hardness of 4 or less and is cleavable. The above-explained titanate is preferably a layer crystal structure lithium potassium titanate.

6 Claims, No Drawings

FRICTION PAIR

FIELD OF INVENTION

This invention relates to a friction material, especially relating to a friction couple used for a vehicle such as an automobile.

BACKGROUND OF INVENTION

Conventionally, a disc brake pad with a friction material affixed on a steel base member has been used as a friction member of a disc brake for an automobile.

Recently, as a brake with superior quietness is on demand, a disc brake pad with a non-asbestos-organic (NAO) friction material likely to produce less brake noise has widely been used.

The NAO friction material is manufactured by forming a friction material composition having a binder, a fiber base other than a steel based fibers such as a steel fiber and a stainless steel fiber, and the NAO friction material is classified as one type of friction materials in addition to a semi-metallic friction material and a low steel friction material that contain the steel based fiber as the friction base. Then, recently, because of the laws and regulations in the United States of America that restricts the amount of copper component therein, the friction material that contains 5 weight % or less of the copper component or does not contain the copper component became more common.

Patent Document 1 discloses the friction material composition that contains the fiber base, the friction modifier, and the binder, where the friction material composition contains the copper component of 0.5 weight % or less in terms of the copper element and contains a granular titanate obtained by granulating the titanate, as the friction modifier, which has an average particle diameter of the granular titanate of 100-250 µm and further discloses the friction material obtained by forming the friction material composition.

Patent Document 2 discloses the friction material composition that contains the fiber base, the inorganic filler, the organic filler, and the binder, including 0.5 mass % or less of the copper amount, where the friction material composition further contains an abrasive with the average particle diameter of 3-5 µm and an abrasive with the average particle diameter of 9-13 µm as the inorganic filler and contains the titanate with the average particle diameter of 1.5-4.5 µm and the titanate with the average particle diameter of 15-45 µm.

As the disc brake pad without containing the predetermined amount of the copper component, the cast iron disc rotor as in Patent Document 3 has been used. The cast iron disc rotor shows low corrosion resistance and has a problem of rusting while in use, and the friction material has been required to find a countermeasure for this problem For example, Patent Document 4 discloses the friction material that has the binder, the friction modifier, and the fiber base without containing the copper component, which improves the descaling performance of the mating member by containing 10-20 volume %, relative to an entire amount of the friction material composition, of at least one type of titanate compound having multiple projections and 10-20 volume %, relative to the entire friction material composition, of the biosoluble inorganic fiber.

However, as a regenerative brake has been progressed due to the development of an electronic automobile and a hybrid automotive, because the brake load applied on the friction material of the conventional hydraulic brake is reduced, a problem of not obtaining sufficient descaling performance even with the technology in the Patent Document 4 exists.

Therefore, the stainless steel disc rotor that has superior rust resistance has been commonly used.

Patent Document 5 discloses the disc rotor for four wheel vehicle, which is manufactured by a stainless steel plate, having the martensite structure or a mixed structure of the martensite structure and the ferrite phase.

Patent Document 6 discloses the disc rotor for an automobile having the structure including the martensite and the carbonitride and selectively including the ferrite.

Patent Document 7 discloses the disc rotor for an automobile made of the stainless steel plate that includes C: 0.005-0.100%, Si: 0.01-1.00%, Mn: 0.010-3.00%, P: 0.040% or less, S: 0.0100% or less, Cr: 10.0-14.0%, N: 0.005-0.100%, V: 0.03-0.30%, Al: 0.001-0.050%, B: 0.0002-0.0050%, Ni: 0-2.00%, Cu: 0-2.00%, Mo: 0-1.00%, W: 0-1.00%, Ti: 0-0.40%, Nb: 0-0.40%, Zr: 0-0.40%, Co: 0-0.400%, Sn: 0-0.40%, REM: 0-0.050% or less, Mg: 0-0.0100%, Ca: 0-0.0100%, Sb: 0-0.50%, Ta: 0-0.3000%, Hf: 0-0.3000%, and Ga: 0-0.1000%, and the remaining substances are Fe and impurities, where a metal structure is made of a ferrite phase and 10-50 particles per 100 µm2 of carbonitride with 0.3 µm or more of equivalent circle diameter exists at an arbitrary cross section thereof.

Because of the above-described background, the friction material that does not contain the copper component but is suitable for the stainless steel disc rotor with superior rust resistance has been on demand; however, it was found that applying the conventional friction material that does not contain the copper component and is used in combination with the cast iron disc rotor to the disc brake employing the stainless steel disc rotor would significantly reduce an enhanced effect and stability in the low speed range.

PRIOR ARTS

Patent Documents

[Patent Document 1] Japanese Provisional Patent Publication No. 2017-57312
[Patent Document 2] Japanese Provisional Patent Publication No. 2018-162385
[Patent Document 3] Japanese Provisional Patent Publication No. 1990-134425
[Patent Document 4] Japanese Provisional Patent Publication No. 2017-149971
[Patent Document 5] Japanese Provisional Patent Publication No. 2016-117925
[Patent Document 6] Japanese Provisional Patent Publication No. 2019-173086
[Patent Document 7] Japanese Provisional Patent Publication No. 2019-178419

SUMMARY OF THE INVENTION

Problems to be Resolved by the Invention

This invention is aimed to provide a friction couple having an enhanced effect and stability in a low speed range, where the friction couple comprises a disc brake pad that is manufactured from a friction material composition having a binder, a fiber base, and a friction modifier without containing a copper component and a ferrous metallic fiber, and a stainless steel disc rotor.

Means to Resolve the Problems

Inventors of this invention, after serious investigation, found that with respect to the friction couple that comprises the disc brake pad having the friction material that is manufactured from the friction material composition having the binder, the fiber base, and the friction modifier without containing the copper component and the ferrous metallic fiber, and the stainless steel disc rotor, the friction couple is capable of having the enhanced effect and stability in the low speed range by using the friction material composition that contains the predetermined amount of the titanate as the friction modifier and that does not contain the cleavable friction modifier with the Mohs hardness of 4 or less.

This invention relates to the friction couple that comprises the disc brake pad having the friction material that is manufactured from the friction material composition having the binder, the fiber base, and the friction modifier without containing the copper component and the ferrous metallic fiber, and the stainless steel disc rotor, and further is based on the following technology.

(1) The friction couple that is comprised of the disc brake pad having the friction material that is manufactured from the friction material composition having the binder, fiber base, and the friction modifier without containing the copper component and the ferrous metallic fiber, and the stainless steel disc rotor, wherein the friction material composition further contains 20-30 weight %, relative to the entire friction material composition, of the titanate as the inorganic friction modifier but does not contain the cleavable friction modifier that has the Mohs hardness of 4 or less.

(2) The friction couple according to (1), wherein the titanate is the layer crystal structure titanate.

(3) The friction couple according to (1), wherein the titanate is the lithium potassium titanate.

Advantages of the Invention

This invention relates to the friction couple that comprises the disc brake pad having the friction material that is manufactured from the friction material composition containing the binder, the fiber base, and the friction modifier without containing the copper component and the ferrous metallic fiber, and the stainless steel disc rotor, and that can provide the friction couple having the enhanced effect and stability in the low speed range.

EMBODIMENT OF THE INVENTION

With respect to conventional cast iron disc rotors, the enhanced effect and stability in the low speed range has been planned by adding relatively large amount of the titanate designing to form a transfer adhesion film of the titanate on the disc rotor surface and the cleavable inorganic friction modifier that has the Mohs hardness of 4 or less such as the mica and the vermiculite to control the uniformity of the thickness of the film in the friction material composition Comparing to the cast iron disc rotors, with respect to conventional stainless steel disc rotors, when the cleavable friction modifier that has the Mohs hardness of 4 or less, which is a prerequisite for controlling the thickness of the transfer adhesion film of the titanate, is added in the friction material composition of the friction material used for the cast iron disc rotor, it was found that the forming of the transfer adhesion film of the titanate is hindered, and that the preferable enhanced effect and stability in the low speed range cannot be obtained.

In consideration of the above-issue, with respect to the friction couple comprising the disc brake pad having the friction material containing the friction material composition having the binder, the fiber base, and the friction modifier without containing the copper component and the ferrous metallic fiber, and the stainless steel disc rotor, this invention uses the friction material composition that contains 20-30 weight %, relative to the entire friction material composition, of the titanate as the inorganic friction modifier and that does not contain the cleavable friction modifier with the Mohs hardness of 4 or less.

By adding 20-30 weight % of the titanate, relative to the entire friction material composition, as the friction modifier, a suitable thickness of the transfer adhesion film of the titanate can be formed on the stainless steel disc rotor surface.

As the titanate, one or a combination of two or more of tunnel crystal structure titanates such as the potassium hexatitanate, the potassium octatitanate, and the sodium hexatitanate, and layer crystal structure titanates such as the lithium potassium titanate and the magnesium potassium titanate may be selected to be used.

Among the above-described titanates, focusing on the structural aspect of the titanate, the use of the layer crystal structure titanate is preferable, and focusing on the composition aspect of the titanate, a single use of the magnesium potassium titanate is preferable.

Also, the form of the titanate can be columnar, platy, particulate, squamous, or indeterminate having multiple projections.

Furthermore, by eliminating the cleavable friction modifier that has the Mohs hardness of 4 or less, which is an indispensable component for the friction material composition that does not contain the copper component and the ferrous metal and is used for the conventional iron cast disc rotor, the obstruction of the formation of transfer adhesion film of the titanate is prevented, thereby obtaining the enhanced effect and stability in the low speed range.

In addition, the friction modifier not to be contained therein may be micas such as the magnesia mica, the potassium mica, and sericite and the vermiculite.

Also, the Mohs hardness used in this invention is an old Mohs, representing 1=talc, 2=gypsum, 3=calcite, 4=fluorite, 5=apatite, 6=orthoclase feldspar, 7=quartz, 8=topaz, 9=corundum, and 10=diamond.

<Friction Material Composition>

The friction material used in the friction couple of this invention is manufactured from the friction material composition having the binder, the fiber base, and the friction modifier in addition to the above-explained titanate.

As the binder, either one of binders that are generally used for the friction material such as a straight phenol resin, an acrylic rubber modified phenol resin, a silicon rubber modified phenol resin, a nitrile rubber (NBR) modified phenol resin, a cashew oil modified phenol resin, an aralkyl modified phenol resin (phenol aralkyl resin) obtained by reacting a phenol compound with a aralkyl ether compound and an aldehyde compound, an acrylic rubber dispersed phenol resin, a silicon rubber dispersed phenol resin, and a fluoropolymer dispersed phenol resin, or a combination of two or more of the above-identified binders may be used.

The amount of the binder contained in the friction material composition is preferably 4-9 weight % relative to the entire friction material composition, more preferably 6-8 weight % relative to the entire friction material composition.

As the fiber base, either one of fiber bases that are generally used for the friction material such as an aramid fiber, an acrylic fiber, a cellulose fiber, and a poly-phenylene benzbisoxazole fiber, or a combination of two or more of the above-identified fiber bases may be used.

The amount of the fiber base contained in the friction material composition is preferably 1-5 weight % relative to the entire friction material composition, more preferably 2-4 weight % relative to the entire friction material composition.

As the friction modifier, a lubricant, an inorganic friction modifier, and an organic friction modifier may be used.

As the lubricant, either one of carbon based lubricants such as an artificial graphite, a natural graphite, a graphite sheet pulverized powder, a petroleum coke, a coal coke, a resilient graphite carbon, and a polyacrylonitrile oxide fiber pulverized powder, or metallic sulfide based lubricants such as a tin sulfide, a molybdenum disulfide, a ferrous sulfide, a bismuth sulfide, a zinc sulfide, and a composite metal sulfide, or a combination of two or more of the above-identified lubricants may be used.

The amount of the lubricant contained in the friction material composition is preferably 10-18 weight % relative to the entire friction material composition, more preferably 11-16 weight % relative to the entire friction material composition.

As the inorganic friction modifier, other than the above-identified titanate, either one of a calcium hydroxide, a calcium carbonate, a barium sulfate, a talc, a dolomite, a zeolite, a triiron tetroxide, a trimanganese tetroxide, a calcium silicate hydrate, a magnesium oxide, a silicon dioxide, a zirconium oxide, a zirconium silicate, a γ-alumina, an α-alumina, a silicon carbide, a wollastonite, a sepiolite, a basalt fiber, a glass fiber, a biosokubable ceramic fiber, or a rock wool, or a combination of two or more of the above-identified inorganic friction modifier may be sued.

The amount of the inorganic friction modifier together with the above-identified titanate contained in the friction material composition is preferably 60-82 weight % relative to the entire friction material composition, more preferably 65-76 weight % relative to the entire friction material composition.

As the organic friction modifier, either one of the inorganic friction modifiers that are generally used for the friction material such as vulcanized rubbers or unvulcanized rubbers such as a cashew dust, a tire tread rubber pulverized powder, a polytetrafluoroethylene powder, an acrylic rubber, an isoprene rubber, a nitrile butadiene rubber, a styrene-butadiene rubber, a butyl rubber, and a silicon rubber, or a combination of two or more of the above-identified organic friction modifiers may be used.

The amount of the organic friction modifier contained in the friction material compassion is preferably 3-8 weight % relative to the entire friction material composition, more preferably 5-7 weight % relative to the entire friction material composition.

<Manufacturing Method for Disc Brake Pad>

The disc brake pad according to this invention is typically manufactured through a mixing step for uniformly mixing the predetermined amount of the friction material composition (raw friction material) by a mixer to obtain a raw friction material mixture, a heat press forming step for positioning the obtained raw friction material mixture superposed on a prewashed, surface-treated, and adhesive-coated back plate in a heat forming die to heat press the raw friction material mixture on the back plate, a heating step for heating to cause a curing reaction of the obtained molded article, a coating step for coating the cured article such as by spray coating and electrostatic powder coating, a baking step for baking the coating, and a grinding step for grinding the baked article by a rotary grinder to form a friction surface.

Further, after the heat press forming step, a heat treatment step, which is a combination of the coating step and the baking step, and then the grinding step may follow respectively.

Also, as appropriate, prior to the heat press forming step, a granulating step for granulating the raw friction material mixture, a kneading step for kneading the raw friction material mixture, and a pre-forming step for forming a pre-formed product by positioning the raw friction material mixture or the granulated article obtained through the granulating step and the kneaded article obtained through the kneading step, may be performed, and a scorching step may be performed after the heat press forming step.

<Stainless Steel Disc Rotor>

As the stainless steel disc rotor, for example, a martensite type stainless steel disc rotor or a ferrite type stainless steel disc rotor may be used.

EMBODIMENTS

This invention is explained concretely using the Embodiments and the Comparative Examples of this invention in the following sections; however, this invention is not limited to the following Embodiments.

Manufacturing Method for the Friction Material According to Embodiments 1-7 and Comparative Examples 1-3

The friction material composition of the composition shown in Table 1 is positioned in the Loedige mixer to be mixed for about 5 minutes and is pressed in a forming die under 30 MPa for about 10 seconds to obtain the pre-formed product. The pre-formed product is superposed on the steel back plate, which is prewashed, surface treated, and adhesive coated, to be heat-formed in the heat forming die at 150 centigrade under the forming pressure of 40 MPa for about 10 minutes, then the heat treatment (postcure treatment) at 200 centigrade is performed for about 5 hours, and the grinding step is performed to form the friction surface, thereby obtaining the disc brake pad for a passenger vehicle.

TABLE 1

|  |  |  | embodiments |  |  |  |  |  |  | comparative examples |  |  |
|---|---|---|---|---|---|---|---|---|---|---|---|---|
|  |  |  | 1 | 2 | 3 | 4 | 5 | 6 | 7 | 1 | 2 | 3 |
|  | binder | straight phenol resin | 7.0 | 7.0 | 7.0 | 7.0 | 7.0 | 7.0 | 7.0 | 7.0 | 7.0 | 7.0 |
|  | fiber base | aramid fiber | 3.0 | 3.0 | 3.0 | 3.0 | 3.0 | 3.0 | 3.0 | 3.0 | 3.0 | 3.0 |
| friction modifier | lubricant carbonaceous lubricants | graphite sheet pulverized powder | 5.0 | 5.0 | 5.0 | 5.0 | 5.0 | 5.0 | 5.0 | 5.0 | 5.0 | 5.0 |
|  |  | petroleum coke | 5.0 | 5.0 | 5.0 | 5.0 | 5.0 | 5.0 | 5.0 | 5.0 | 5.0 | 5.0 |
|  |  | natural graphite | 1.0 | 1.0 | 1.0 | 1.0 | 1.0 | 1.0 | 1.0 | 1.0 | 1.0 | 1.0 |
|  | metal sulfide lubricants | molybdenum disulfide | 1.0 | 1.0 | 1.0 | 1.0 | 1.0 | 1.0 | 1.0 | 1.0 | 1.0 | 1.0 |

TABLE 1-continued

|  |  | embodiments |  |  |  |  |  |  | comparative examples |  |  |
|---|---|---|---|---|---|---|---|---|---|---|---|
|  |  | 1 | 2 | 3 | 4 | 5 | 6 | 7 | 1 | 2 | 3 |
| inorganic friction modifier | magnesia mica |  |  |  |  |  |  |  | 1.0 |  |  |
|  | vermiculite |  |  |  |  |  |  |  | 1.0 |  |  |
|  | zirconium oxide | 20.0 | 20.0 | 20.0 | 20.0 | 20.0 | 20.0 | 20.0 | 20.0 | 20.0 | 20.0 |
|  | zirconium silicate | 1.0 | 1.0 | 1.0 | 1.0 | 1.0 | 1.0 | 1.0 | 1.0 | 1.0 | 1.0 |
|  | magnesium oxide | 1.0 | 1.0 | 1.0 | 1.0 | 1.0 | 1.0 | 1.0 | 1.0 | 1.0 | 1.0 |
|  | potassium titanate |  |  |  |  |  | 25.0 |  |  |  |  |
|  | lithium potassium titanate | 20.0 | 23.0 | 25.0 | 28.0 | 30.0 |  |  | 25.0 | 18.0 | 32.0 |
|  | magnesium potassium titanate |  |  |  |  |  |  | 25.0 |  |  |  |
|  | calcium hydroxide | 3.0 | 3.0 | 3.0 | 3.0 | 3.0 | 3.0 | 3.0 | 3.0 | 3.0 | 3.0 |
|  | barium sulfate | 27.0 | 24.0 | 22.0 | 19.0 | 17.0 | 22.0 | 22.0 | 20.0 | 29.0 | 15.0 |
| organic friction modifier | cashew dust | 4.0 | 4.0 | 4.0 | 4.0 | 4.0 | 4.0 | 4.0 | 4.0 | 4.0 | 4.0 |
|  | tire tread rubber pulverized powder | 2.0 | 2.0 | 2.0 | 2.0 | 2.0 | 2.0 | 2.0 | 2.0 | 2.0 | 2.0 |
|  | total | 100.0 | 100.0 | 100.0 | 100.0 | 100.0 | 100.0 | 100.0 | 100.0 | 100.0 | 100.0 |

Furthermore, test pieces of the Embodiments 1-7 and the Comparative Examples 1-3 are prepared by cutting the friction material for the disc brake pad into 25 mm×15 mm pieces Table 2 shows the "Testing Condition", "Material of Mating Member", "Evaluation Items", and "Evaluation Standard" used to examine the enhanced effect and stability in the low speed range for those test pieces.

TABLE 2

|  |  | stability of braking effectiveness in a low speed range |
|---|---|---|
| testing condition |  | based on JASO C406 friction tester (1/10 scale tester) |
| material of the mating member |  | martensitic stainless steel |
| evaluation Items |  | changes relative to μ level of the base material × cast iron at JASO-C406 friction testing |
| evaluation Standard | E | 0.38 with tolerance of less than ±5% |
|  | G | 0.38 with tolerance of more than ±5% but less than ±10% |
|  | P | 0.38 with tolerance of ±10% or more but less than ±15% |
|  | F | 0.38 with ±15% or more allowance |

Table 3 shows the evaluation result of the respective Embodiments and Comparative Examples with respect to the enhanced effect and stability in the low speed range of the Table 2.

TABLE 3

|  | embodiments |  |  |  |  |  |  | comparative examples |  |  |
|---|---|---|---|---|---|---|---|---|---|---|
|  | 1 | 2 | 3 | 4 | 5 | 6 | 7 | 1 | 2 | 3 |
| evaluation result stability of braking effectiveness in a low speed range | P | G | E | G | P | P | G | F | F | F |

E = excellent
G = good
P = pass
F = fail

From the Table 2, it can be seen that the friction material satisfying the conditions of this invention shows satisfactory results with respect to the enhanced effect and stability in the low speed range.

INDUSTRIAL APPLICABILITY

According to this invention, the friction couple, comprising the disc brake pad having the friction material manufactured from the friction material composition having the binder, the fiber base, and the friction modifier without containing the copper component and the ferrous metallic fiber and the stainless steel disc rotor, can provide the enhanced effect and stability in the low speed range and can provide the excellent practical value.

The invention claimed is:

1. A friction couple comprising:
   a disc brake pad including a friction material manufactured from a friction material composition comprising a binder, a fiber base, and a friction modifier, wherein the friction material composition is free of both a copper component and a ferrous metallic fiber; and
   a stainless steel disc rotor,
   wherein the friction material composition contains 20-30 weight % of a titanate, relative to an entire friction material composition as an inorganic friction modifier, and
   wherein the friction material composition does not include any friction modifier having a Mohs hardness of 4 or less and being cleavable.

2. The friction couple according to claim 1,
   wherein the titanate has a layer crystal structure.

3. The friction couple according to claim 2,
   wherein the friction modifier is a mica or a vermiculate.

4. The friction couple according to claim 1,
   wherein the titanate is a lithium potassium titanate.

5. The friction couple according to claim 4,
   wherein the friction modifier is a mica or a vermiculate.

6. The friction couple according to claim 1,
   wherein the friction modifier is a mica or a vermiculate.

* * * * *